Figure 1:
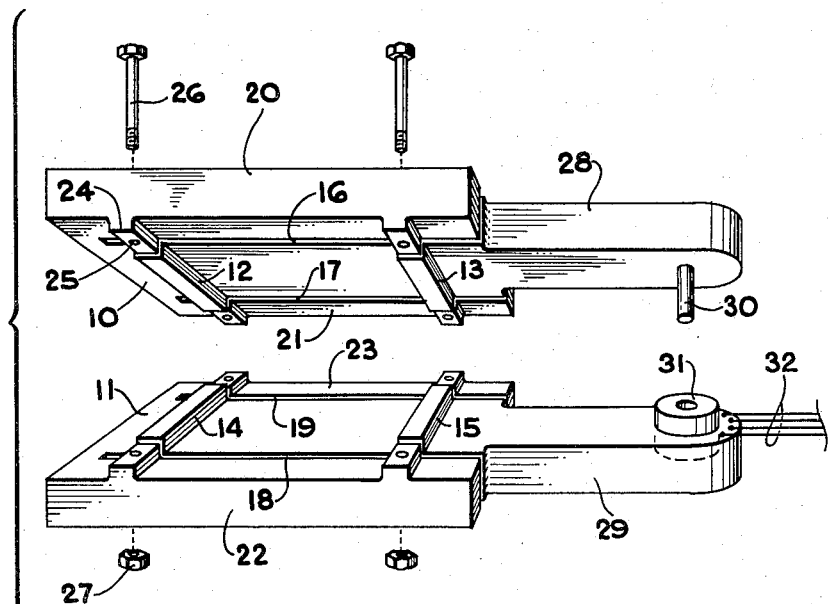

March 13, 1962 R. A. WEBSTER 3,024,648
DOUBLE BEAM FORCE MEASURING INSTRUMENT
Filed Nov. 3, 1958

*INVENTOR.*
ROBERT A. WEBSTER
BY *Elliott & Pastoriza*
*ATTORNEYS*

United States Patent Office 3,024,648
Patented Mar. 13, 1962

3,024,648
DOUBLE BEAM FORCE MEASURING
INSTRUMENT
Robert A. Webster, Santa Monica, Calif., assignor to
Webster Instrument, Inc., a corporation of California
Filed Nov. 3, 1958, Ser. No. 771,373
2 Claims. (Cl. 73—141)

This invention relates generally to force measuring instruments and more particularly to an improved portable type instrument employing the principle of bending beams.

There are many instances in which it is desired to measure the force between opposing portions of certain pieces of machinery. For example, it is important to know and be able to calibrate force exerted between the electrodes of a welding machine since the effectiveness of such a machine in making welds depends in large part in accurately applying predetermined forces to the parts to be welded together.

While many simple types of force measuring instruments capable of indicating forces from zero to forty thousand pounds or even higher have been available, most are limited in their use because they are too large to fit between the opposing members of a machine, such as the electrodes of a welding machine in order to take a reading. If an attempt is made to reduce considerably the external dimensions to provide a relatively flat instrument to fit in between opposing members, the mechanism internally within the instrument itself suffers in its ability to withstand large loads and still provide accurate indications.

Bearing the foregoing in mind, it is a primary object of the present invention to provide a greatly improved force measuring instrument in which the force measuring elements themselves are of relatively thin dimensions to the end that the instrument has wide versatility in making force measurements in normally inaccessible places.

Another important object is to provide an instrument of the foregoing type including positive overload protection means so that the possibility of damage to the instrument itself in the event of large overloads is avoided.

Still another object is to provide an instrument which may be employed to actuate a transducer to provide an electrical output signal which is a function of the forces being measured.

Still other objects of the invention are to provide an improved portable force measuring instrument which is extremely rugged and simple in design, and which is capable of indicating loads between zero to forty thousand pounds and even higher with extreme accuracy.

Briefly, these and many other objects and advantages of this invention are attained by providing an instrument employing double bending beams. These beams preferably take the form of plate members having opposed bending portions held in spaced relationship by transverse parallel ridges. The arrangement is such that if a squeezing force is applied to oposite sides of the beams tending to urge their central portions together, the ridges act as lever fulcrums resulting in corresponding extending ends of the beams becoming separated. Suitable indicating means may then be connected between the extending ends to provide a reading responsive to changes in the relative positions of these ends upon application of a squeezing load to the plate members.

Since only the plates themselves need be subjected to the forces to be measured, very little relative spacing is required to accommodate the plates and thus the device is well suited for measuring the force between the electrodes of a welding machine. By proper dimensioning of the plates themselves, the versatility of the instrument may be greatly extended. The use of double plates provides a mechanical amplification factor at the extended ends of the plates so that an accurate indication may be provided notwithstanding relatively little movement of the load bearing portions of the plates may take place.

Figure 2:
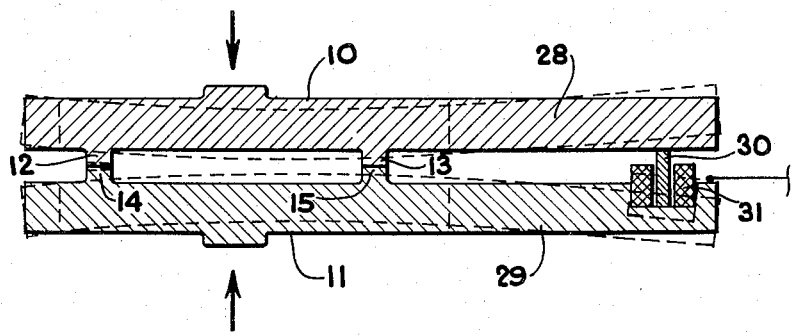

A better understanding of a preferred embodiment of the invention will be had by referring to the accompanying drawings, in which:

FIGURE 1 is an exploded perspective view of the force measuring instrument in which certain dimensions have been exaggerated for purposes of clarity; and, FIGURE 2 is a cross section of the assembled instrument of FIGURE 1.

Referring first to FIGURE 1, the force measuring instrument comprises a pair of bending beams in the form of plate members 10 and 11. Each of these plate members includes a pair of spaced parallel transverse ridges on one face such as indicated at 12 and 13 for the member 10 and at 14 and 15 for the member 11. The arrangement is such that when the members 10 and 11 are placed in face to face relationship, the top edges of the pairs of ridges will mate as shown clearly in FIGURE 2.

In order to secure the plates 10 and 11 together in opposing relationship and yet isolate the securing points from the bearing portion of the ridges, each of the plates is provided with a pair of slots running longitudinally adjacent the longitudinal edges of the plates and terminating short of corresponding ends of the plate members. These slots are indicated at 16 and 17 for the upper plate 10 and at 18 and 19 for the lower plate 11. The extreme outer longitudinal edges of the plates such as indicated at 20 and 21 for the plate 10 and 22 and 23 for the plate 11 are thus substantially isolated by the longitudinal slots from the central portions of the plates.

The ridge portions on the longitudinal isolated edges are machined to less height than the central portion of the ridges as indicated at 24 for the ridge 12. Suitable receiving holes, such as indicated at 25 for the reduced ridge portion 24, pass through the plates and are arranged to receive bolts and nuts such as 26 and 27, for securing the members 10 and 11 together.

Inasmuch as the ridges at the points of securement are slightly shorter in dimension than the remaining portions of the ridges, a pre-loading is effected on the central portions of the ridges 12, 13, 14, and 15 so that the top edge bearing portions thereof are in tight engagement when the plates are assembled together as indicated in FIGURE 2.

While the structure of the instrument has been described as comprising separate plates which are secured together, it will be understood to those skilled in the art that it may be possible to form the double beam structure out of an integral piece of metal by suitable mechaning out of side and central portions of the material to leave integral connecting sections corresponding to the ridges. The manufacture is simplified, however, by employing separate plates and securing them together as described.

As shown in both FIGURES 1 and 2, the corresponding ends of the plate members 10 and 11 where the isolating slots open out include reduced width extending portions 28 and 29. The extending portion 28 may be provided with a slug 30 and the extending portion 29 provided with a differential transformer coil 31 arranged to receive the slug 30. Relative movements between the extending portions 28 and 29 will thus result in a change in the position of the slug 30 with respect to the differential transformer coils 31 to the end that an electrical signal which is a function of the relative positions of the extending ends 28 and 29 will be provided in output leads 32.

It will, of course, be understood that the element 30 and the differential transformer windings 31 merely represent one type of electrical transducer for converting the physical motion of the extending ends into an electrical signal, and that other suitable transducers may equally well be used. Moreover, rather than any type of electrical transducer, a simple mechanically responsive force dial could be connected between the opposed portions to provide a dial reading indicative of the spacing between the extending portions and thus indicative of forces applied to the plate members.

Refering specifically, to FIGURE 2, the operation of the force measuring instrument will be evident. When it is desired to measure the force between two opposing members or between a single member and a stationary work table or the like, the plate members 10 and 11 are positioned between the opposing members and a squeezing force applied thereto as indicated by the arrows in FIGURE 2. Such squeezing force is directed intermediate the ridges such as to tend to bend the plates 10 and 11 in opposite directions as indicated by the dotted lines. Since two bending means are provided, the extending ends 28 and 29 will both separate from a central longitudinal plane and thus a mechanical amplification factor of two is provided. The repositioning of the slug 30 with respect to the coils 31 as a result of the movement of the extending portions 28 and 29 will result in an electrical signal in the output leads 32 which may be amplified and connected to a voltmeter or the like suitably calibrated to read force in pounds.

In the actual bending of the plates, very little physical motion takes place and the dotted line position illustrated in FIGURE 2 as well as the height of the various ridges from the opposing surfaces of the members is greatly exaggerated in order to clearly set forth the operation of the device. The fastening bolts at the longitudinal edges of the two plates are substantially isolated as a consequence of the longitudinal slots and this isolation is extremely effective particularly since the actual physical motion is relatively small.

It will be evident that the loading capability of the device can be increased considerably by varying the width of the plates. An increase of width dimensioning not only renders the opposed plates or beams relatively "stiffer" thereby decreasing the actual physical deflection of the members under any given load, but additionally enables the members themselves to be made thinner to provide an equal deflection for an unchanged load. Another important feature of the design is that the dimensioning of the plates may be such that the opposing faces of the plate members between the ridges will engage each other prior to exceeding the elastic limit of the members so that overload protection is automatically provided.

From the foregoing description, it will be evident that the present invention has provided an extremely simple portable type force measuring instrument which is capable of accommodating large loads. The instrument is not only extremely accurate as a consequence of the employment of two bending beams in opposed relationship to provide the mechanical amplification factor of 2, but most importantly, the force measuring elements engaged may be made relatively thin and close together so that the device can be readily accommodated between the electrodes of a welding machine.

Modifications falling within the scope and spirit of the present invention will readily occur to those skilled in the art. The force measuring instrument is, therefore, not to be thought of as limited to the particular embodiment set forth only for illustrative purposes.

What is claimed is:
1. A force measuring instrument comprising, in combination: first and second plate members each having a generally rectangular portion and a forwardly extending portion, each of said plate members having a pair of spaced, parallel transverse integral ridges on one face such that when said plates are positioned in face to face relationship, the top edges of said ridges are in engagement to hold the remaining opposing surfaces of said plates in spaced relationship; each of said plates including longitudinally extending slots adjacent its longitudinal edges passing through said ridges and opening out one end of the plate, said slots terminating short of the other end of the plate; fastening means passing normally through said plates and said ridges between the longitudinal edges and the correspondingly located adjacent slot for securing said plates in said face to face relationship, the portions of said ridges through which said fastening means extend being of less height from the corresponding faces of said plates whereby said plates are held against sliding movement with respect to each other and a pre-bearing load is provided on the remaining portions of said ridges upon tightening of said fastening means; each said forwardly extending portion extending from said one end of each plate respectively between said opening out point of said slots; and transducer means connected between the forwardly extending portions responsive to relative movements thereof upon application of a squeezing load to said first and second plates at points intermediate said transverse ridges.

2. The subject matter of claim 1, in which the height of said ridges is such that said opposing faces will engage each other under load within the elastic limit of said plates.

References Cited in the file of this patent
UNITED STATES PATENTS

| | | |
|---|---|---|
| 2,382,289 | Burt | Aug. 14, 1945 |
| 2,388,966 | Harrison | Nov. 13, 1945 |
| 2,695,518 | Huck | Nov. 30, 1954 |
| 2,839,919 | Lathrop | June 24, 1958 |
| 2,930,227 | Spademan et al. | Mar. 29, 1960 |

FOREIGN PATENTS

| | | |
|---|---|---|
| 875,275 | Germany | Apr. 30, 1953 |

OTHER REFERENCES

Publication, Journal of Scientific Instruments, volume 24, November 1947, pages 298, 299. "A Gauge for Measuring Compression Forces" by Rinkel. (Copy in 73–141.)